INVENTOR.
HANS RICHARD ANSGAR HANSEN
BY
ATTORNEY

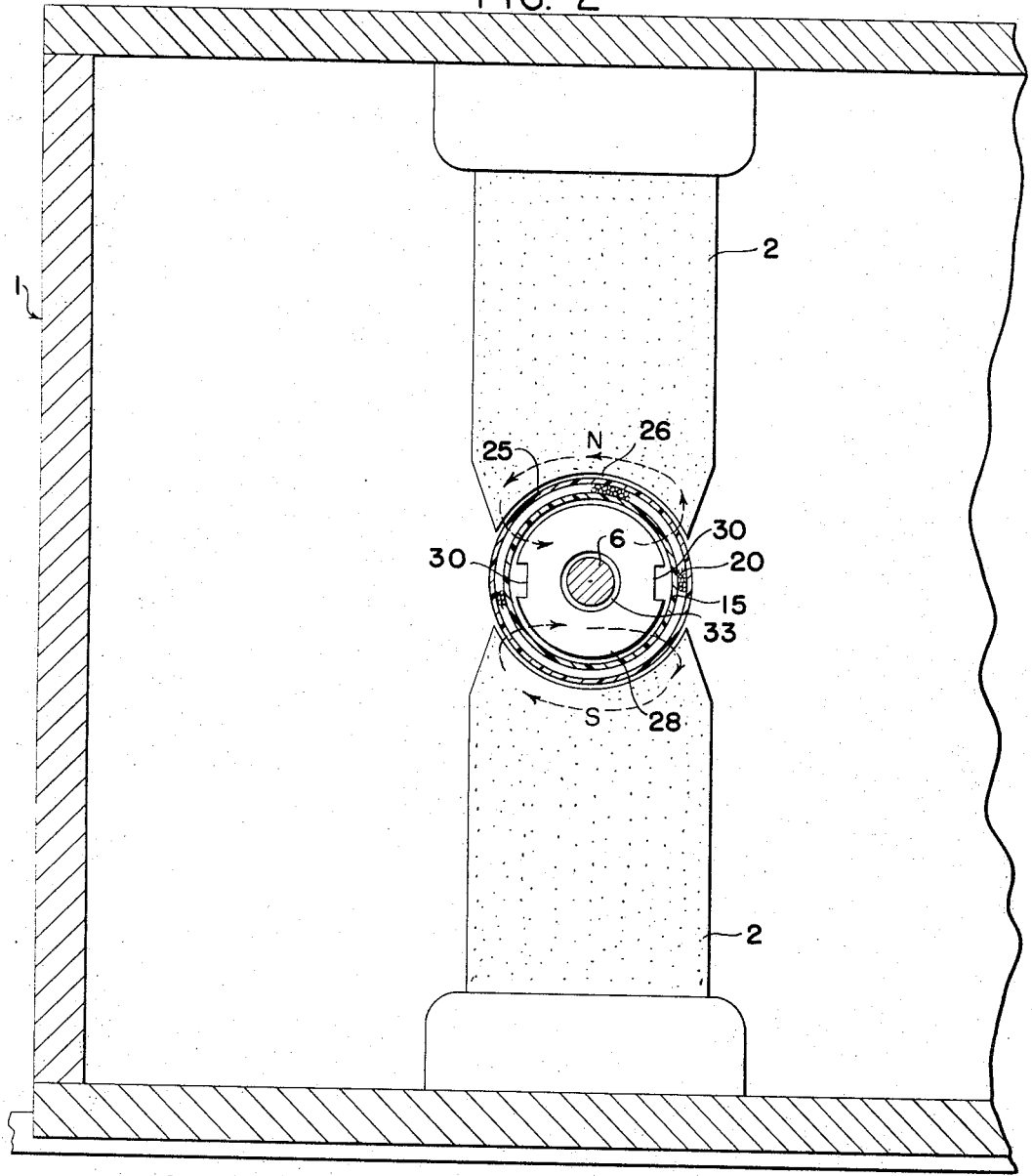
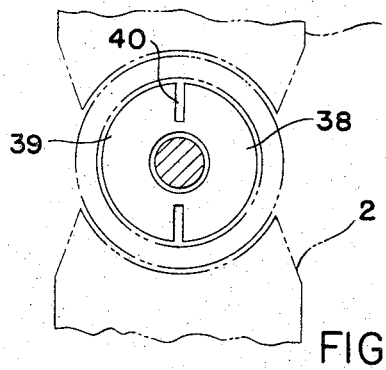
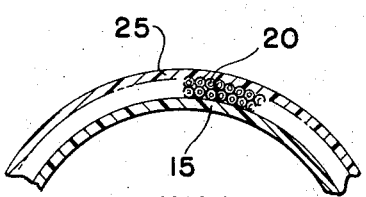

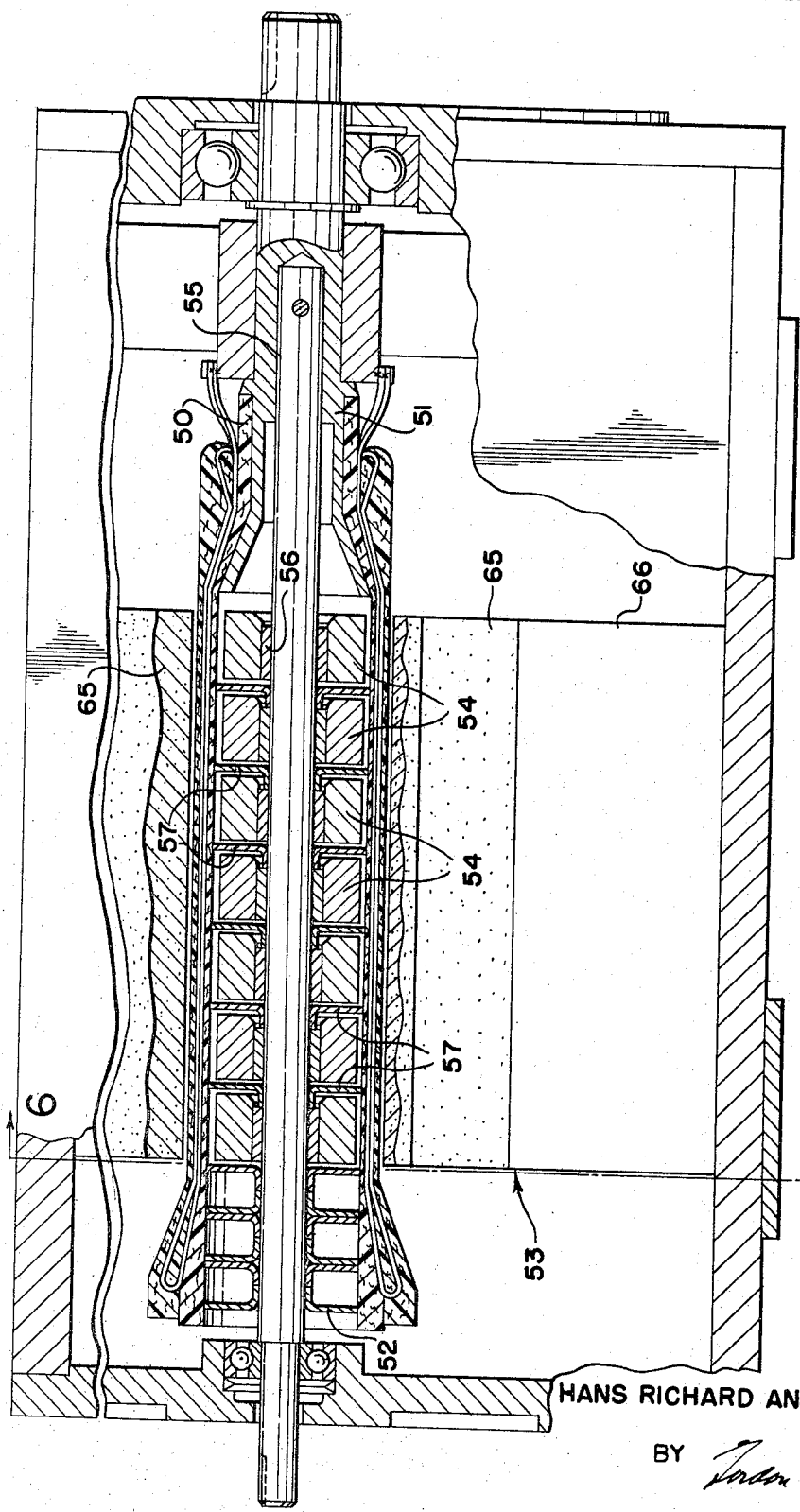

INVENTOR.
HANS RICHARD ANSGAR HANSEN

ATTORNEY

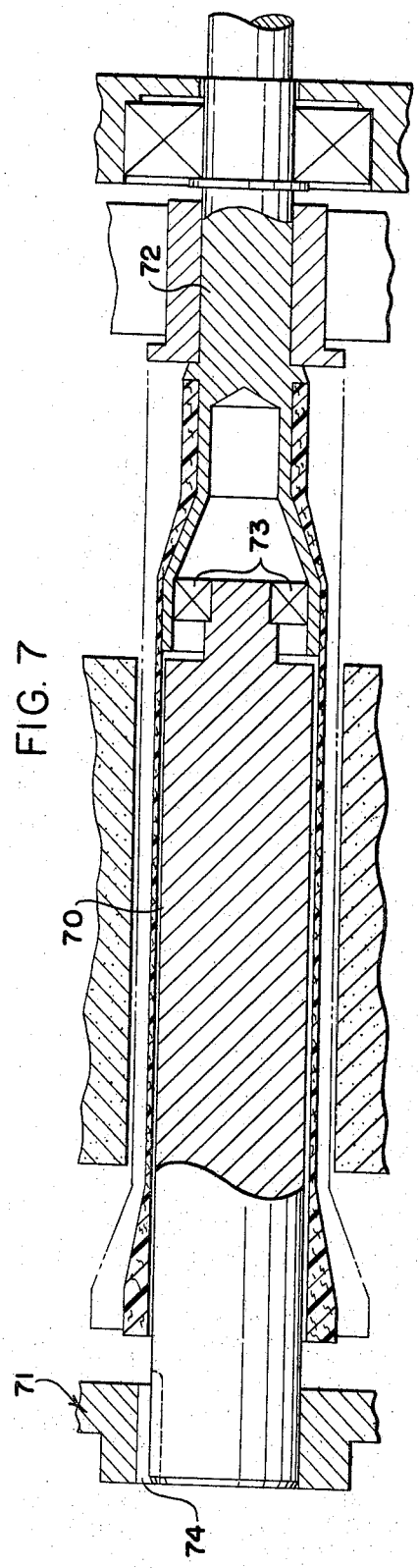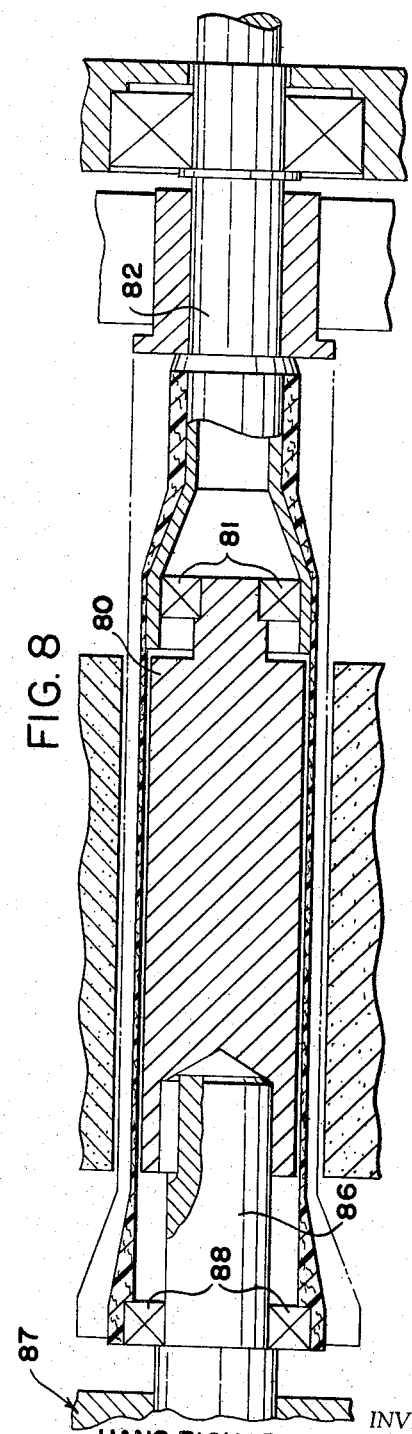

Aug. 8, 1967    H. R. A. HANSEN    3,335,309
DIRECT CURRENT MOTOR
Filed March 11, 1964    6 Sheets-Sheet 6
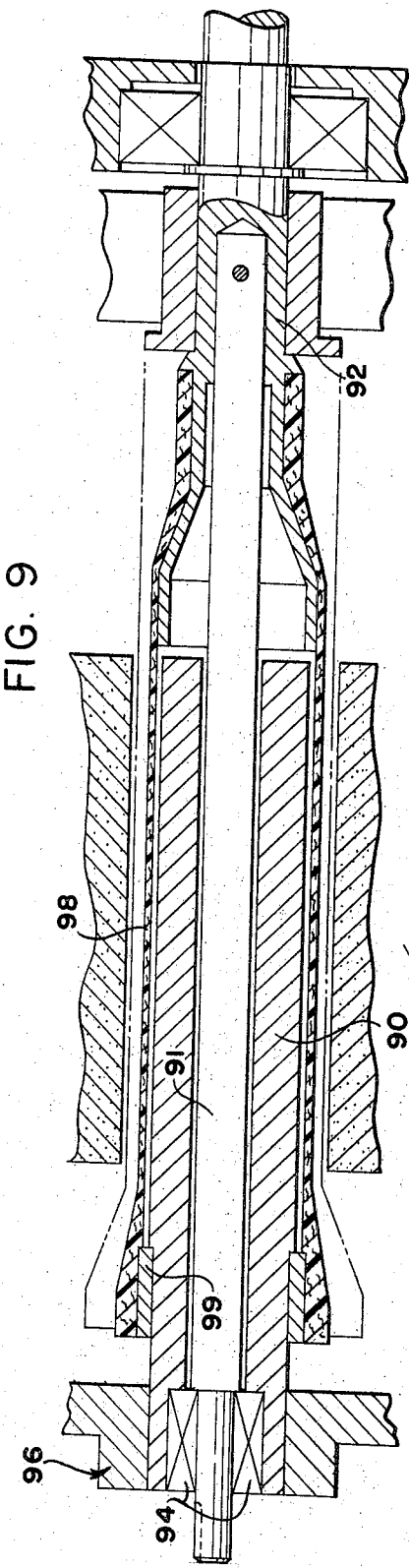
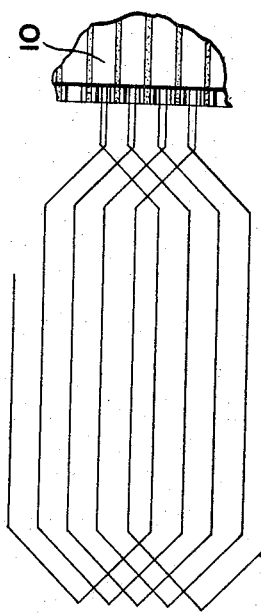
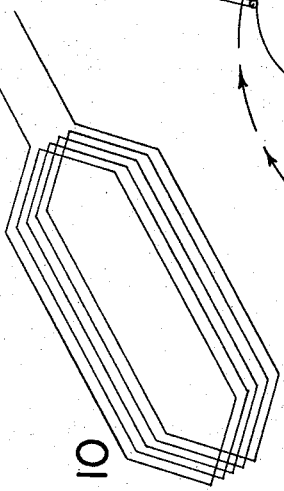
INVENTOR.
HANS RICHARD ANSGAR HANSEN
BY
ATTORNEY 3,335,309
DIRECT CURRENT MOTOR
Hans Richard Ansgar Hansen, Akron, Ohio, assignor to The Imperial Electric Company, Akron, Ohio, a corporation of Ohio
Filed Mar. 11, 1964, Ser. No. 351,048
2 Claims. (Cl. 310—266)

This invention relates to a low-inertia, low-reactance, high-torque, direct-current motor.

The stator of the motor is provided, in any usual manner, with two or more permanent magnets. The armature is provided with windings on a shell which encloses one or more magnetizable cores (usually iron or steel) which are not fastened to the shell and remain stationary within the shell, or relatively so, particularly when the motor is accelerating or decelerating. A cylindrical shaft may extend through the motor housing, and in such case the magnetizable core or cores are preferably cylindrical and mounted about the shaft on self-lubricating bearings. If there is a single core, this may be fastened to the motor housing and be at least partially supported by it. In the preferred embodiment of the invention the core or cores are stationary or substantially stationary. There are, therefore, no eddy currents generated in the cores and consequently they are usually not laminated.

The core or cores are generally cylindrical, and although they may comprise features which cause them to remain perfectly or substantially stationary between the magnets, this is not essential. If no such provision is made they may rotate in the direction of the armature, slowly at first, and at a higher speed as time elapses. By providing floating cores which are not forced to turn with the shell or winding, or with the central shaft (if there is a central shaft), the inertia of the motor can be considered the inertia of only the shell and winding, and of the central shaft if there is one. Thus, the mass of the core has no or little effect on the total armature inertia.

In the conventional D.C. motors the coils of the armature windings are usually contained in slots in the armature core. The armature core supports the winding and rotates with the winding. In the motor of this invention the winding is not supported by the armature core but is carried on the shell which is usually cylindrical although it may be many sided in which case the number of sides is advantageously equal to the number of coils. The coils are usually spread out uniformly on the surface of the shell. Usually each coil consists of a number of turns, with each turn laid directly on the shell. The end of one coil is connected to the same commutator bar as the beginning of the next adjacent coil in the usual manner. The winding diagram is conventional.

Because the cores are located within the winding, the main shaft normally does not extend from one side of the housing to the other. It is replaced by a stub shaft which supports one end of the shell and preferably the commutator. Although the stub shaft may be the sole support for the shell, there may be a small shaft which extends from the stub shaft to the opposite side of the housing where it is supported by a bearing in the motor housing or in any other suitable manner, and this opposite end of the small shaft usually supports the opposite end of the shell. There may be a number of supports for the shell located along this small shaft. The core is advantageously divided into a relatively large number of small sections each measuring from a fraction of an inch to a few inches, each supported independently of all of the others by a separate bearing, with a spider or the like between each two of these small cores attached to the small shaft and supporting the shell. An advantage of this structure is that the shell may be very thin, and thus minimize the depth of the air gap between the magnets and the cores.

Although the support of the winding on a separate shell necessitates the provision of a wider air gap than the conventional structure, and usually this is detrimental, this disadvantage is offset by the fact that the shell and the winding rotate independently of the armature core or cores which therefore do not contribute to the inertia of the motor. Due to the large air gap, the armature reaction flux is low; hence the motor can be considered an extremely low-reactance type motor. Because of the low inertia and low reactance, the motor will have a very fast response.

Because of the larger air gap, the motor is usually designed with permanent magnets instead of electro magnets. The very low permeability of the permanent magnets helps to decrease armature reaction and the armature reactance is low.

The invention is further described in connection with the drawings, in which—

FIGURE 2 is a section on the line 2—2 of FIGURE 1;

FIGURE 3 is an enlarged cross section of the shell and winding;

FIGURE 4 is a section showing an alternative core structure;

FIGURE 5 is a section through a preferred design in which the use of a plurality of independent cores is illustrated;

FIGURES 7, 8 and 9 are sections through further alternative designs; and

FIGURES 10–12 illustrate the armature winding and its application.

Figure 1:
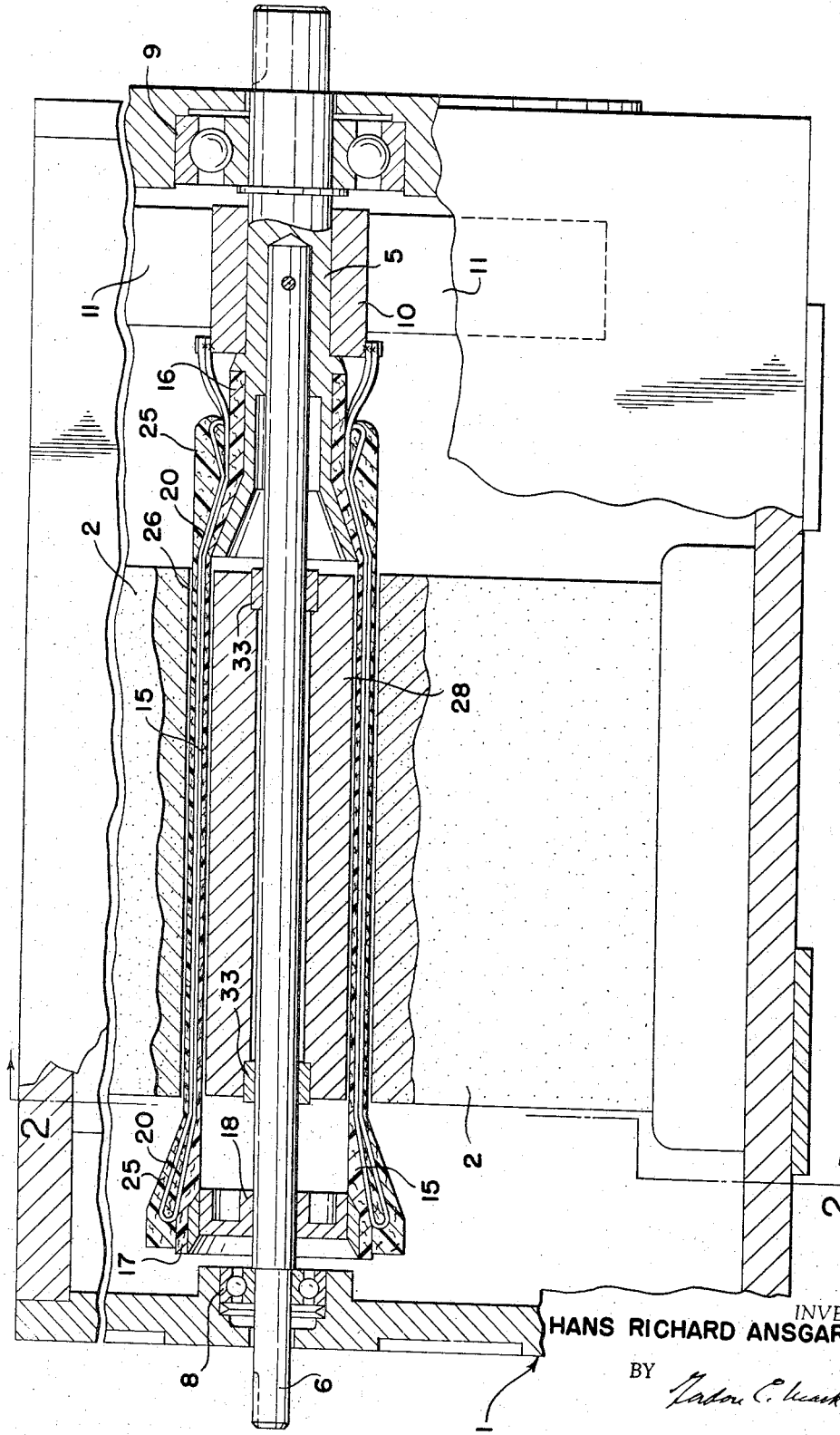
FIGURE 1 is a section of a motor with parts of the magnets in the adjacent housing broken away to show the shell and winding supported at one end by a stub shaft and at the other end by a spider, from a small shaft which extends from the stub shaft, with the core supported so that the shell and winding rotate independently of the core.

Referring to FIGURE 1, the housing 1 may be of any usual construction, with permanent magnets 2 which may number two or four or any suitable number.

The armature is located within the magnets and includes the stub shaft 5 and the smaller shaft 6 which extends from the stub shaft to the housing at the opposite side of the motor where it is supported in the bearing 8. The stub shaft is supported in the bearing 9. Fastened to the shaft 5 is the commutator 10 and the bearing 9. It rotates within the brushes 11.

The shell 15 is very thin, particularly in the portion located between the magnets. This is almost always composed of an insulating composition and may advantageously be formed from fiberglass treated with a resin. At the end 16 adjacent the commutator this shell is united to the stub shaft 5. The opposite end 17 is supported on the spider 18 which is united to the shaft 6. The winding 20 is supported directly on the shell. It is advantageously encased in insulating material 25, such as an epoxy resin. There is a narrow air gap 26 between the resin and the magnets 2. Within the shell is the core 28. It is usually of soft iron, but may be of any conventional core material.

If the core 28 is unitary and perfectly cylindrical it will rotate with the armature, but with lagging speed, at least when the motor is started up. To prevent such rotation the sides of the core are indented with shallow side grooves 30 (FIGURE 2). The magnetic field of the magnets 2 prevents this core from taking any position except that illustrated in FIGURE 2. The core is supported on bearings 33 which are preferably self-lubricating such as porous bronze or nylon. It floats on the shaft 6, and remains stationary while the armature rotates within and about it.

The magnets may be retained in a stationary position by other means such as illustrated by the slit core of FIGURE 4 in which the two halves 38 and 39 may be separated by an air gap 40; or this gap may be filled with non-magnetic material. The gap 40 need not extend to the shaft but should be so deep that the magnetic flux travels directly through the two core portions 38 and 39 and maintains the core in the position shown.

In FIGURE 3 the winding 20 is a conventional D.C. winding except that it is uniformly distributed on the surface of the shell 15 instead of being placed in slots in a rotating core, as is done in conventional D.C. machines. The winding is divided into bundles of coils as is usual in a conventional winding, as illustrated in FIGURE 10. As in conventional windings, the end of one bundle is connected with the same bar of the commutator as the beginning of the next adjacent bundle, as illustrated in FIGURE 12. In one method of applying the winding to the shell, a bundle is formed on the shell to form the lower layer of the winding, and subsequently it is folded over a bundle formed on the opposite surface of the shell (FIGURE 11), or on any other convenient segment of the shell as known in the art, to form the upper layer of the winding, much as in the application of coil bundles in a conventional D.C. motor.

The structure of the armature design shown in FIGURE 5 resembles that shown in FIGURE 1 except that a number of cores are utilized. This is an advantage because it makes it possible to provide for more supports for the shell and a thinner shell can be used. The shell 50 is supported on the stub shaft 51 at one end. There is a spider 52 at the other end but this is not necessary. Between the magnets 53 there are a number of cores 54, each separated from the shaft 55 by a separate bearing 56. They are preferably of a type such as shown in FIGURE 2 or FIGURE 4, so that they remain stationary while the armature is rotated.

Between each two cores is a spider 57 which is fastened to the shaft and supports the shell 50. These spiders rotate with the shaft and the shell. It will be appreciated that these spiders may be of magnetizable material or non-magnetizable material. They are advantageously made of steel and are fabricated to be of light weight so as to minimize the inertia added by their presence. Because of the added support of these spiders the shell may be thinner than otherwise.

Figure 6:
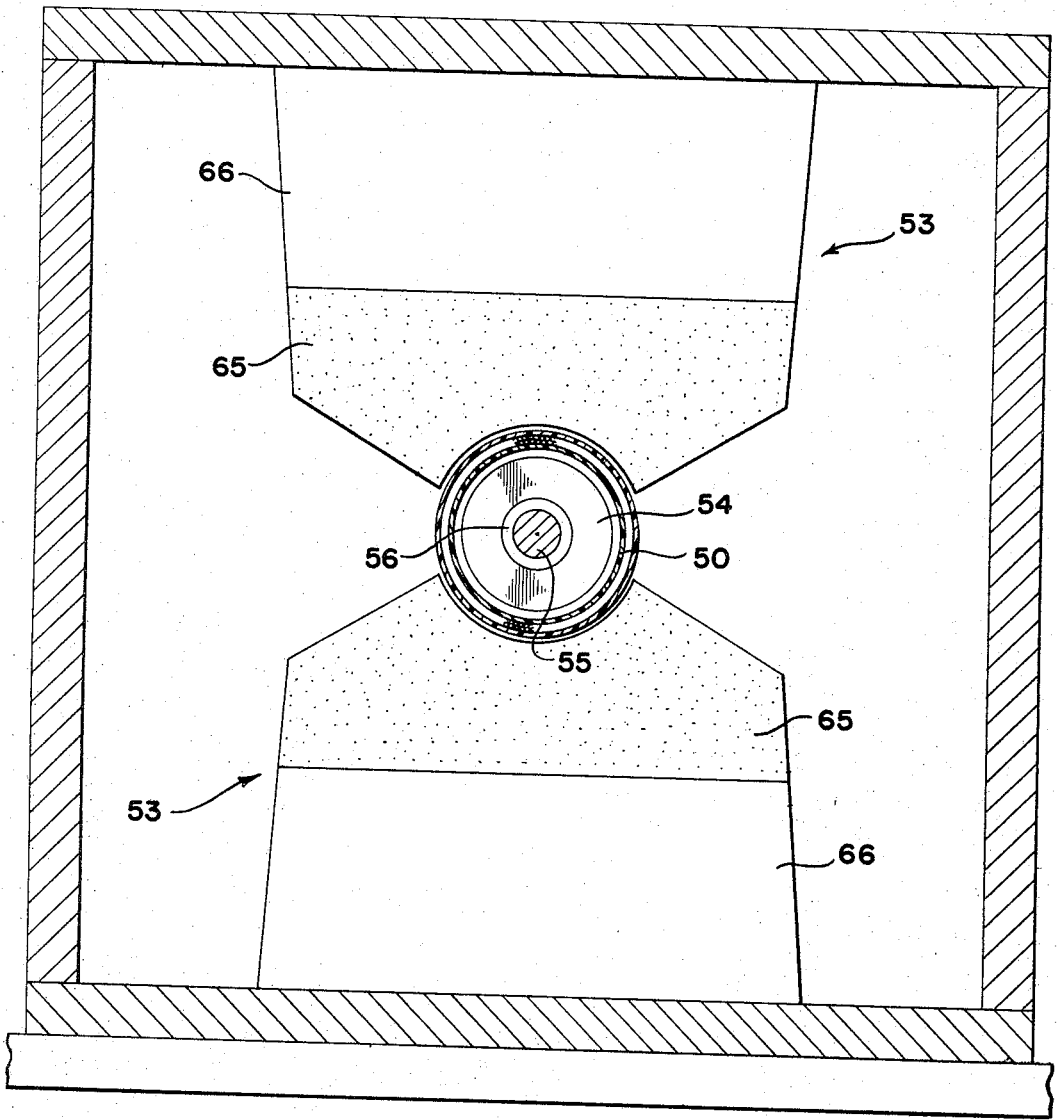
FIGURE 6 is a section on the line 6—6 of FIGURE 5, and illustrates the use of a compound magnet structure.

FIGURE 6 shows the inner portion of each magnet 53 as composed of a permanent magnet material 65 capable of carrying the high flux density which is necessary in the air gaps between the magnets and the armature. Applicable material is the alloy of 8% aluminum, 14% nickel, 24% cobalt and 3% copper, such as Alnico VCC, available commercially from various sources. The outer portion 66 is composed of permanent magnet material of the highest possible coercive force, in order that the over-all permanent magnets 53 may be as short as possible. Applicable material is, for example, an alloy of 7% aluminum, 15% nickel, 34% cobalt and 4% copper, such as Alnico VIII.

In conventional D.C. motors which use laminated cores the air gaps can be held to such a low tolerance that sufficient magnetic force can be achieved by electro magnets or by permanent magnets with less coercive force. In the motors of this invention the cores preferably do not rotate and, therefore, are not laminated. Laminations are customary in the conventional motors to prevent eddy currents which build up losses which do not build up in the motors of this invention because the cores are stationary or relatively so. In the conventional motors using laminated cores the air gaps are very small. It is because of the necessity of using larger air gaps to accommodate the shells and winding that the high coercive force magnets are desirable.

FIGURE 7 illustrates a modified design in which mechanical means is provided to prevent the core 70 from rotating. This core is supported by the motor housing 71, and the core, in turn, provides support to the inboard end of the stub shaft 72 through bearing 73. The shaft is keyed to the motor housing by key 74, or is welded to it, or otherwise fastened in the housing in such a way that it does not rotate.

In FIGURE 8, the core 80 is supported at one end by the bearing 81 in the stub shaft 82, and at the other end by the second stub shaft 86 which is affixed to the housing 87. The bearing 88 supports one end of the shell.

In the alternative design illustrated in FIGURE 9, the core 90 surrounds the small shaft 91 which is fastened at one end to the stub shaft 92. At the other end, it rotates within the bearing 94 which is mounted within the core 90. This end of the core is held stationary within the housing 96. The shell 98 is supported at one end by the stub shaft 92, and at the other end it is supported by the bearing 99 which separates it from the core. Other bearings, preferably of the self-lubricating type, may be located along the small shaft 91 to support the core.

The core is advantageously held against rotation by providing it with greater resistance to the magnetic flux in one direction than in any other direction, all as illustrated.

The invention is covered in the claims which follow.

What I claim is:

1. A direct current motor with magnets in the stator, an armature winding supported on an essentially cylindrical shell composed of an insulating composition, shaft means supporting said shell at both of its ends which shaft means extends beyond the shell and is supported at both ends beyond the shell in bearings, the shell being united to the shaft means at the first end and supported away from the shaft at the second end, and within the shell a rotatable magnetizable core, the core being rotatable independently of the shell and shaft.

2. A direct current motor with magnets in the stator, an armature winding supported on an essentially cylindrical shell supported at least at one end by the motor shaft, and within the shell a rotatable, magnetizable core composed of a plurality of portions each separately supported by a shaft portion which is rotatable with the motor shaft, and the shell is supported from the shaft portion between each two core portions, the core portions being rotatable independently of the shell and shaft.

References Cited

UNITED STATES PATENTS

| | | | |
|---|---|---|---|
| 377,683 | 2/1888 | Mather | 310—266 |
| 396,355 | 1/1889 | Dyer | 310—266 |
| 2,479,455 | 8/1949 | Aronoff | 310—154 |
| 2,482,875 | 9/1949 | Sawyer | 310—154 |
| 2,974,242 | 3/1961 | Apstein | 310—266 |
| 3,001,093 | 9/1961 | Wilcox et al. | 310—266 |

MILTON O. HIRSHFIELD, *Primary Examiner.*

L. L. SMITH, *Assistant Examiner.*